Feb. 18, 1958 J. D. AMBROSE 2,823,784

STRIP RECORD SIGNALING

Filed Jan. 14, 1955

INVENTOR.
JACK D. AMBROSE
BY
ATTORNEY.

United States Patent Office 2,823,784
Patented Feb. 18, 1958

2,823,784

STRIP RECORD SIGNALING

Jack D. Ambrose, Los Angeles, Calif.

Application January 14, 1955, Serial No. 481,931

2 Claims. (Cl. 197—9)

This invention relates generally to signaling or identifying desired portions of a record made upon a continuous strip of sheet material and particularly describes a method and apparatus for producing such a record and relates moreover to the record so produced.

Many records are made on long continuous strips of sheet material such as paper or the like. These records include, for example, paper tapes used in adding machines and similar accounting and business apparatuses as well as mechanical stenographic devices such as those shown in Patent No. 1,933,833. Frequently the records so made are stored for future reference. Also such records, particularly in the case of mechanical stenographic machines, are referred to shortly after being made, such as in the case of records of testimony given in court proceedings and the like. Reference to desired portions of such records is customarily time-consuming and inefficient in practice since no identification means have been provided to localize the search for a desired point or portion of the record.

According to my present invention, it is possible to mark a desired portion of a longitudinally extending record bearing strip by lancing a portion of the body strip itself and folding such lanced portion through an angle of 180° so that the lanced portion extends partially beyond the edge of the strip proper and thus constitutes a signaling or identifying tab. Any of many specific means may be employed for accomplishing this, it being necessary in all cases that the lanced portion remain partially attached to the strip body proper at the base of the lanced portion, and that the base be close enough to the edge of the record strip to allow the tab to project beyond such edge. The record so made, when referred to thereafter, thus provides immediately visible indices of important portions in the form of outwardly projecting tabs at the marked points.

Accordingly it is a principal object of the present invention to provide a novel method and apparatus for identifying a desired point in a continuous record bearing strip.

Another object of the invention is to disclose, in combination with a machine for making a record on a continuous strip of bendable material, apparatus by which to lance or otherwise cut a portion of the bendable strip near the edge thereof and to fold such lanced portion outwardly to project beyond the edge of the strip.

Another object of the invention is to disclose method and apparatus for record signaling not requiring extraneous elements such as tabs to be adhesively or otherwise applied to the record bearing strip.

A further object of the invention is to disclose a record bearing strip with desired points spaced longitudinally of the strip being identified by outwardly projecting tabs integral with the strip.

Additional objects and purposes of the invention will become apparent from a study of the following description of a preferred embodiment thereof taken in connection with the accompanying drawing in which.

Figures 1, 2, 3, 4, 5, 6, 7:
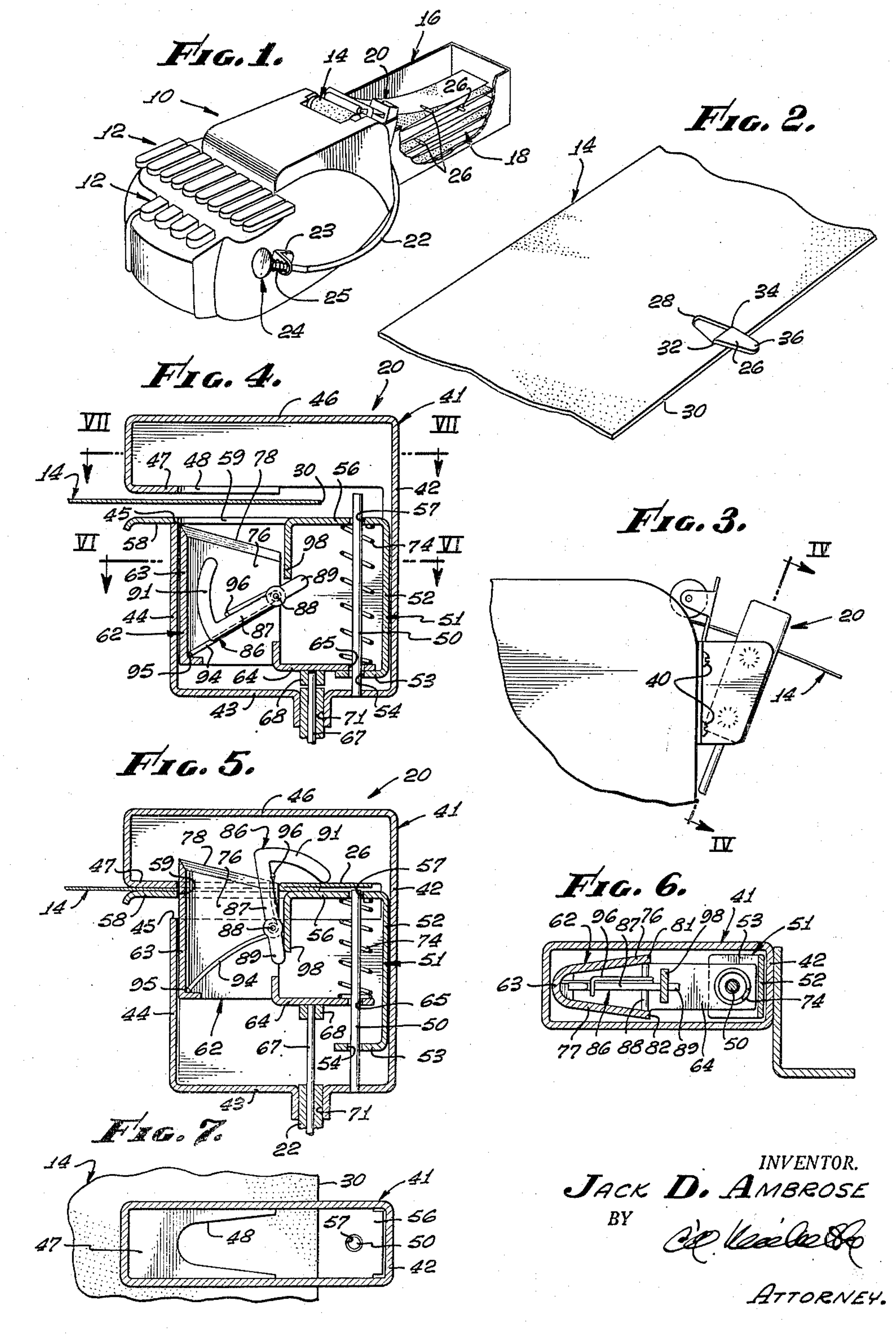
Fig. 1 is a perspective view of a mechanical stenographic machine having a device of my invention attached thereto, a portion of the receiving tray of the machine being broken away in order to clearly show the record strip folded therein.
Fig. 2 is a perspective view on an enlarged scale of a fragmentary portion of a record strip with a tab formed therein and projecting beyond the edge thereof in accordance with my invention.
Fig. 3 is a fragmentary side elevational view of an attachment in accordance with my invention as used with the machine shown in Fig. 1.
Fig. 4 is a sectional view taken on line IV—IV of Fig. 3 with the parts shown in normal or inoperative position.
Fig. 5 is a view similar to that of Fig. 4 showing the parts after the tab portion of the strip has been cut and folded.
Fig. 6 is a sectional view taken on line VI—VI of Fig. 4.
Fig. 7 is a sectional view taken on line VII—VII of Fig. 4.

As previously stated, the present invention is usable in conjunction with any of many types of record making apparatus employing a strip or similar body of relatively thin bendable sheet material having an edge of regular configuration. In the typical case such edge will be continuous and straight, as in the case of a strip of paper, the so-called "tape" as used in adding machines and similar devices. For illustrative purposes the invention will be described herein in connection with a mechanical stenographic machine but it will be understood that such a machine is exemplary only of the type of equipment in conjunction with which the present invention may be effectively used.

Referring now in detail to the drawing and first to Fig. 1 thereof, there is shown a stenographic machine indicated generally at 10 having one or more banks of keys 12 to be digitally operated by the user, the keys being adapted to print through conventional mechanism upon a continuous paper strip indicated generally at 14. The strip is fed over a platen, the details of which are well known and are not described in detail here, and the strip then falls into a receiving tray indicated generally at 16 disposed at the rear of the machine 10. In the case of a mechanical stenographic machine of this type, the record is in the form of a folded strip of paper, so that in coming from the machine 10 the strip folds itself in alternate layers in the receiving tray 16 as shown generally at 18. An apparatus or device for accomplishing the signaling on the record strip in accordance with the present invention may be attached to the rear of the machine 10 and is indicated generally at 20. Means are provided for facilitating operation of the device 20 by the operator, and such means are here shown as including a cable or the like 22 leading to a digitally operable plunger 24 conveniently attached by bracket means 23 to the side of the machine near the front thereof and available for operation by the person using the machine when desired. The plunger 24 is desirably biased into inoperative position by suitable resilient means 25.

It will be noted in the record bearing strip 18 collected in the receiving tray 16 that several tabs 26 appear on the record and project outwardly beyond the edge of the strip. One of these tabs is shown in the enlarged view of Fig. 2. As there shown, the tab may desirably be formed in a U-shape, the base 28 of the U being directed inwardly relative to the side edge 30 of the record strip 14 and the open end of the U being defined by two points 32 and 34 spaced slightly inwardly from the outer edge 30 of the strip. After the U-shaped portion has been cut along the curvilinear line extending inwardly from the points 32 and 34, the tab 26 is folded outwardly to assume the position seen in Fig. 2. It will be particularly noted that the outer tip 36 of the tab 26 projects well beyond the side edge 30 of the strip 14 and is thus clearly visible even when the paper strip is formed into a pile of folded strip elements as seen at 18 in Fig. 1. Thus any point in the record borne on the folded strip 18 which has been previously identified by the operator may be located with a minimum of searching by reference to the several tabs 26 identifying the selected points in the record. It is to be noted also that no additional or auxiliary elements are added to the record bearing strip in forming the tab, but only an integral portion of the strip folded outwardly is used for the identifying or signaling purposes.

Any suitable means may be used for forming the tab 26 in accordance with the present invention. A presently preferred means for forming such tab is indicated generally at 20 in Fig. 3 and is shown in detail in Figs. 4, 5, 6 and 7. As will be seen in Fig. 3, the apparatus 20 is desirably attached by suitable means 40 to the rear of the stenographic machine 10 in such a way that the record tab made by the apparatus 20 will be physically close to the portion of the strip 14 on which a record is being made at the time the apparatus 20 is actuated.

As best seen in Figs. 4 and 5, the apparatus 20 includes a frame or housing indicated generally at 41 having an outer side wall 42, a bottom 43 and an inner side wall 44 terminating in an upper edge 45. The frame 41 likewise is provided with a top 46 having an upper backing plate 47 lying in a plane parallel to and spaced slightly above the record-bearing strip 14. The backing plate 47 is provided with a generally U-shaped cut away portion 48 (see Fig. 7), with the open end of the U directed rightwardly as seen in the drawing.

Extending upwardly from the bottom 43 is a rod 50. A bracket indicated generally at 51 is longitudinally movable within frame 41 and includes a side wall 52 in slidable contact with the side wall 42 of the frame. The bracket 51 also includes an inturned lower leg 53 having an aperture 54 encircling rod 50 and an inturned upper leg 56 similarly provided with an aperture 57 in which rod 50 is slidably journaled. The upper leg 56 continues inwardly or leftwardly as seen in the drawing to form a flat plate 58 extending parallel to and spaced below the upper backing plate 47. The plate 58 includes a cut away portion 59 which may be similar in size and shape to the U-shaped cut away portion 48 of the upper backing plate 47.

Means are provided within the frame 41 for cutting or lancing a portion of the record bearing strip 14 which lies between the two plates 47 and 58. Such means are here shown as including a carrier indicated generally at 62 having a vertical end portion 63 adapted to slidingly contact the inner surface of side wall 44 of the frame 41. The carrier 62 also includes an outwardly extending bottom 64 having adjacent its outer end an aperture 65 in which the rod 50 is slidably journaled.

Means are provided for moving the carrier 62 upwardly and downwardly within the frame 41. In the present illustration these means include an actuating member 67 which may desirably take the form of a flexible shaft fixed to the lower surface of the bottom 64 by suitable means 68. The flexible shaft 67 extends downwardly as seen in the drawing and outwardly of the frame 41 through an opening 71 formed in the bottom 43. A flexible sheath 22 surrounds the flexible shaft 67 and corresponds to the similarly numbered cable referred to in connection with Fig. 1. A resilient member such as spring 74 is housed within the frame 41 and surrounds a portion of the rod 50. The upper end of the spring 74 bears against the lower surface of leg 56 and the lower end bears against the upper surface of the projecting lower member 64. Thus the carrier 62 is biased downwardly as seen in the drawing into the normal position shown in Fig. 4.

The carrier 62 is generally U-shaped as seen in plan including a pair of wall members 76 and 77 (see Fig. 6) extending rightwardly from the end portion 63 previously referred to. The upper extent of the carrier 62 includes an upwardly directed cutting edge 78, and the cutting edge 78 may lie in an inclined plane as seen in Figs. 4 and 5 in order to facilitate cutting or lancing during operation. The cutting edge 78 registers with the U-shaped cut away portion 48 of the upper plate 47 in order to form a cut in the record strip 14 extending from the extremity 81 of one wall 76 of the cutter to the extremity 82 of the other wall 77 of the cutter.

Means are provided for folding the cut out portion of record bearing strip 14 outwardly or rightwardly as seen in the drawing about an axis determined by the outer extremities 81 and 82 of the cutter. These means include an arm indicated generally at 86 having a straight portion 87 pivotally connected to the cutter 62 for rotation about an axis 88. An extension 89 of the straight portion 87 projects beyond the pivotal axis 88. At the other end of the straight portion 87 of the arm 86 there is formed an angularly projecting finger 91, preferably arcuate in shape as shown. The arm 86 is continuously biased counterclockwise as seen in the drawing about the axis 88 by suitable resilient means such as spring 94. The spring 94 is fixed at one end 95 to the cutter 62 and extends around the pivotal axis 88 to an arm 96 bearing downwardly on the arm 87 as seen in Fig. 4. The bracket 51 includes a stop member 98 extending downwardly from its upper leg 56 and adapted to abut against the extension 89 of the pivotally mounted arm 86.

The operation of the mechanism will in major respects be understood from the preceding description. When the parts are in their normal position, shown in Fig. 4, the record bearing strip 14 may move freely between the plates 47 and 58, since those plates are spaced apart. When it is desired to signal a particular point along the record bearing strip 14, the operator depresses the plunger 24 which is connected to the end of flexible shaft 67 within sheath or cable 22. Initial movement of the flexible shaft 67 upwardly as seen in Figs. 4 and 5 serves to move the bracket 51 upwardly into its position seen in Fig. 5, with the record bearing strip 14 thus held between the plates 47 and 58. Continued upward force applied to flexible shaft 67 and thus to carrier 62 compresses the spring 74 and thus allows carrier 62 to move upwardly relative to the bracket 51. This movement first brings the cutting edge 78 into position to cut or lance a portion of the strip 14, commencing at the bight of the U-shaped cutter. Continued upward movement of the cutter completes the lancing operation and causes the arm 86 to be rotated clockwise by reason of the abutting contact between the stop member 98 and the extension 89. Thus the lanced portion 26 of the record strip 14 is folded outwardly through an angle of 180° so that its outer portion 36 projects beyond the edge 30 of the strip 14 as shown in Fig. 2.

Relaxation of force applied to plunger 24 permits the parts to return to their position shown in Fig. 4, thus freeing record strip 14 for resumption of its movement as determined by the operation of the machine 10. Accordingly it will be seen that there is here provided a novel and effective means for signaling desired points along a record bearing strip. It will be readily understood that many modifications and changes may be made from the specific illustrated mechanism for lancing the strip. It is particularly to be noted that the indexing or signaling tab 26 according to the present invention is itself a portion of the record bearing strip 14 and hence no additional or other material is necessary in practicing this invention. Although the signaling tab is herein shown as U-shaped in contour, nevertheless it will be obvious that any desired shape may be employed so long as such shape permits a portion of the lanced tab to project beyond the edge of the strip after being folded out.

The physical structure and location of the mechanism 20 and the flexible cable 22 may be changed as desired without departing from the inventive concept herein. For example, the mechanism 20 may be reversed in orientation so that the cutting and folding operations are made downwardly instead of upwardly as herein exemplarily shown. Moreover, the actuating plunger 24 may be located wherever desired and may even be directly integrated into the mechanism 20 so that the flexible cable 22 is wholly eliminated. When the invention is practiced in connection with an adding machine printing on a paper tape, it may be desirable that the cutting and folding operations be actuated by the "total" or "subtotal" key so that those points on the tape are signaled and are hence readily locatable at a later time.

Modifications and changes not departing from the spirit of the invention are intended to be embraced within the scope of the following claims.

I claim:

1. In combination, a machine for making a record on an elongated strip of thin bendable material longitudinally movable relative to the machine, said material having a rectilinear edge; selectively actuable means for lancing a portion of said material along a line extending inwardly of the strip from a pair of spaced points defining an axis generally parallel to and spaced slightly from the edge; and means for folding said lanced portion about said axis through an angle of 180°.

2. In combination, a digitally operable machine for making a record on a body movable relative to the machine, the body being made of thin bendable material having an edge of regular contour; and digitally operable means for lancing a portion of said material adjacent its edge and folding the lanced portion through 180° whereby to project outwardly of the edge.

References Cited in the file of this patent

UNITED STATES PATENTS

| | | |
|---|---|---|
| 1,130,595 | Hawkins | May 2, 1915 |
| 2,300,623 | Hornung | Nov. 3, 1942 |